United States Patent [19]
Okuno et al.

[11] Patent Number: 5,865,751
[45] Date of Patent: Feb. 2, 1999

[54] ULTRASONIC DIAGNOSTIC APPARATUS WHICH PERFORMS COMPLEX VECTOR PHASE CORRECTION TO ECHO SIGNALS OBTAINED IN TIME SEQUENCE FROM EACH ULTRASONIC TRANSDUCER

[75] Inventors: Yoshiyuki Okuno, Fussa; Masahiko Gondo, Yamanashi, both of Japan

[73] Assignee: Olympus Optical Co., Ltd., Tokyo, Japan

[21] Appl. No.: 858,538

[22] Filed: May 16, 1997

[30] Foreign Application Priority Data

Jun. 11, 1996 [JP] Japan .................................... 8-149313
Jan. 17, 1997 [JP] Japan .................................... 9-006684

[51] Int. Cl.$^6$ .................................................. A61B 8/00
[52] U.S. Cl. ........................................ 600/443; 600/447
[58] Field of Search .................................... 600/459, 447, 600/443, 444, 446

[56] References Cited

U.S. PATENT DOCUMENTS

| | | | |
|---|---|---|---|
| 4,852,577 | 8/1989 | Smith et al. ............................. | 600/443 |
| 5,172,343 | 12/1992 | O'Donnell ............................... | 600/447 |
| 5,235,982 | 8/1993 | O'Donnell . | |
| 5,329,930 | 7/1994 | Thomas, III et al. .................. | 600/447 |
| 5,331,964 | 7/1994 | Trahey et al. ........................... | 600/447 |
| 5,349,960 | 9/1994 | Gondo . | |
| 5,487,306 | 1/1996 | Fortes ...................................... | 600/447 |
| 5,531,117 | 7/1996 | Fortes ...................................... | 600/447 |
| 5,605,154 | 2/1997 | Ries et al. ................................ | 600/444 |
| 5,626,138 | 5/1997 | Hossack et al. ........................ | 600/459 |

OTHER PUBLICATIONS

Katakura et al.; Japan Acoustic Institute Journal; vol. 44, No. 7, pp. 496–502, 1988.
J. E. Powers et al.; IEEE Transaction on Sonics and Ultrasonics; vol. Su–27, No. 6, pp. 287–294; Nov. 1980.

*Primary Examiner*—William E. Kamm
*Assistant Examiner*—Maulin Patel
*Attorney, Agent, or Firm*—Armstrong, Westerman, Hattori, McLeland & Naughton

[57] ABSTRACT

Each of a plurality of transducers comprising a transducer array of an ultrasonic probe are sequentially driven, and the echo signals obtained from each of the transducers are stored in memory as complex data, following A/D conversion, quadrature detection, and the like. These complex data are read following a wave-front locus which converges on the focal point set as an observation point, and further the vector directions of each of the complex data are subjected to phase correction and synthesized, thus obtaining an ultrasonic image with high resolution.

29 Claims, 15 Drawing Sheets

FIG.9A
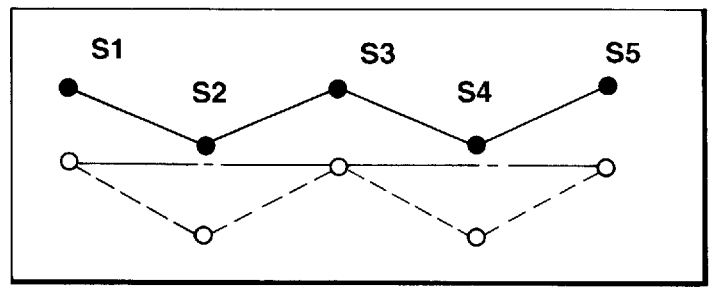
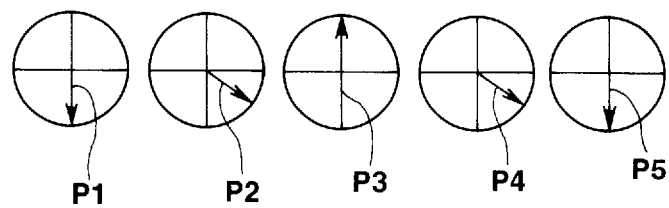
FIG.9B
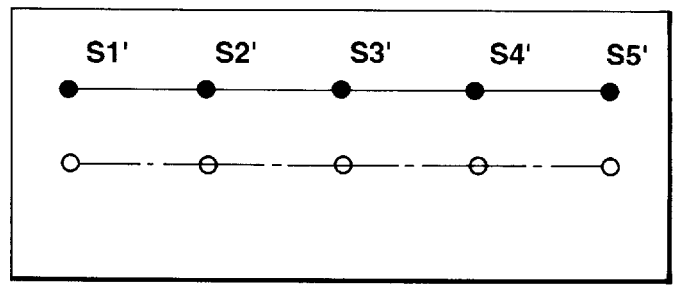
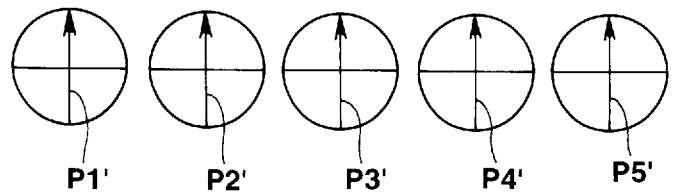

FIG.10A FIG.10B
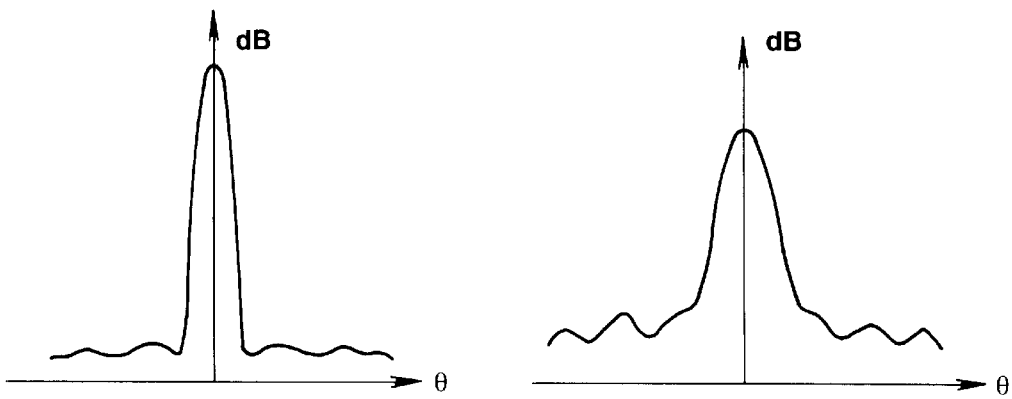
FIG.11
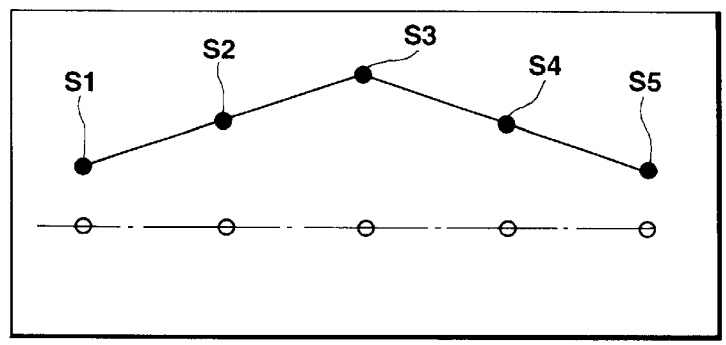
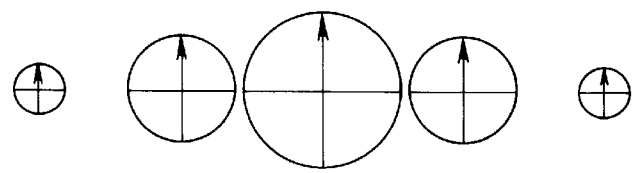
FIG.12
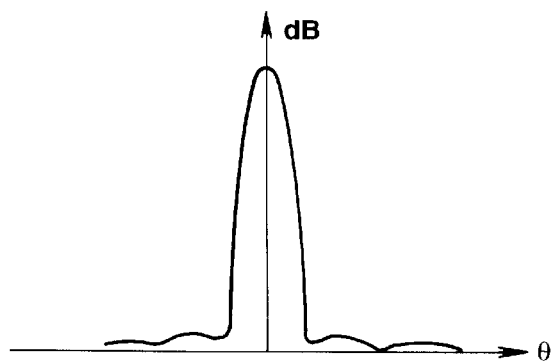

ULTRASONIC DIAGNOSTIC APPARATUS WHICH PERFORMS COMPLEX VECTOR PHASE CORRECTION TO ECHO SIGNALS OBTAINED IN TIME SEQUENCE FROM EACH ULTRASONIC TRANSDUCER

BACKGROUND OF THE INVENTION

1. Field of the Invention

The present invention relates to an ultrasonic diagnostic apparatus which performs complex vector phase correction to echo signals obtained in time sequence from each ultrasonic transducer thereof, with regard to an organism, thereby obtaining an ultrasonic tomography image with high resolution.

2. Description of the Related Art

There are ultrasonic diagnostic apparatuses which emit ultrasounds into an organism, receive the waves reflected from within the organism tissue and process the received signals so as to obtain an ultrasonic tomography image of the organism. Such an apparatus is capable of obtaining an ultrasonic tomography image without exposing the subject to X-rays as with an X-ray diagnostic apparatus which must use X-rays to obtain an X-ray photograph, and for this reason is widely used for examinations and the like in obstetrics and gynecology.

FIG. 1 illustrates an example of the block configuration of an ultrasonic diagnostic apparatuses 51 of prior art which employs the aperture synthesis method. The ultrasonic probe 52 has an array of piezoelectric transducers 53-1 through 53-5.

The signal generating circuit 54 is connected to the piezoelectric transducers 53-1 through 53-5 via transmitting amplifiers 56-1 through 56-5 connected to a transmission drive circuit 55, whereby driving signals are applied to each of the piezoelectric transducers 53-1 through 53-5, thus emitting ultrasonic pulses into the object under inspection.

Further, the ultrasonic transducers 53-1 through 53-5 each connected to a multiplexer 57 via signal lines, and one ultrasonic transducer 53-$i$ ("i" denotes one of 1 through 5) is selected. The same ultrasonic transducer 53-$i$ which was used for transmission is selected by the multiplexer 57 to receive the ultrasounds reflected from the object under inspection. The received ultrasounds are converted into electrical signals, and fed to a receiving amplification circuit 58. This receiving amplification circuit 58 is controlled by a STC (sensitivity time control) circuit or STC control circuit 59, and amplification to a certain amplitude is performed.

The output signals of this receiving amplification circuit 58 are input to a band pass filter 60, and following removal of unnecessary noise, are converted to digital signals by an A/D converter 61, and subsequently are stored to a wave-front memory 62 which stores wave-front data.

This operation is performed through the transducer 53-5 by switching with the multiplexer 57. After switching has been performed through the transducer 56-5 and the data has been stored in the wave-front memory 62, data corresponding with the focal point to be synthesized from the wave-front memory 62 is extracted, based on an address generated by the wave-front locus look-up table (LUT) 63, addition processing is conducted by the adding circuits 64-1 and 64-2, and squared by the squarers 65-1 and 65-2.

Since the property of wave is defined by both its amplitude and phase, the precise synthesis of a certain wave-front requires both real and imaginary components of each point of the wave-front. For this reason, both real and imaginary components are read out of the wave-front memory 62 separately, using two types of addresses generated from the wave-front locus LUT 63, namely real wave-front locus and imaginary wave-front locus. Real and imaginary components are summed and squared by the adding circuits 64-1, 64-2 and the squarers 65-1, 65-2 respectively, to produce squared real and imaginary amplitudes corresponding to the reflection from the focal point where the wave-front converges. The obtained real amplitude and imaginary amplitudes are added by the adder 66 and then output to a digital scan converter (DCS) 67.

FIG. 2 is a schematic illustration regarding the example of prior art illustrated in FIG. 1, of the state of data stored in the wave-front memory 62, the data being received echo signals quantized by the A/D converter 61 by means of quadrature sampling. Here, the blank circles indicated in FIG. 2 by a1, a2, and so forth denote sample points of quantized data, the solid circles denote sample points on the real wave-front locus, and the double circles denote sample points on the imaginary wave-front locus which of which the phase is 90° offset from the real wave-front locus denoted by the solid circles.

For example, in the event that an echo signal with a center frequency of 7.5 MHz is sampled with sampling frequency of 60 MHz, the number of samples of each cycle T of the echo signal is 60/7.5=8. The time t during this sampling being converted to phase is 360°/8 samples=45°.

With the method of the prior art, data of sample points on real and imaginary wave-front locus is extracted, which is separated by respective adding circuits for real components and imaginary components and then squared, and then obtaining the synthesized output of the focal point by adding these.

This wave-front locus is a type of address information which is determined by the relative relationship regarding ultrasonic wave propagation between the focal point which is to be imaged and each transducer. By means of changing this wave-front locus, the focal point position is changed in a two-dimensional manner so as to cover the display area, and a B-mode ultrasonic tomography image which corresponds to the display area is obtained.

According to the above-described method, the echo signals are quantized by the A/D converter 61, the data obtained is extracted as complex data along wave-front locus for real component and imaginary component, synthesizing a B-mode image. According to literature ("Ultrasonic Beam Formation by Discrete Processing and the Method Thereof", Katakura et al, Japan Acoustic Institute Journal Volume 44, No. 7) which describes a beam forming method wherein signal synthesis processing is performed by using quadrature sampling technique, high time precision (i.e., phase precision) is required with synthesis according to quadrature sampling technique, in order to decrease unnecessary components in synthesized results.

However, with the above-described example of prior art, there are limitations to the conversion speed of the A/D converter 61 used in actual practice, so that the A/D converted echo signals for one cycle are of coarse quantization, i.e., 8 samples, which converted into phase precision is 45°. In the event that synthesis is performed with such low phase precision, there is a problem wherein side lobes are formed by the unnecessary components, which degrade the final B-mode image, and accordingly, the B-mode image or ultrasonic tomography image with high resolution cannot be obtained.

In order to suppress such side lobes, quantizing of the echo signals to a finer degree to realize high time precision is sufficient. However, in order to realize such, a high-speed A/D converter and large capacity memory become necessary, resulting in problems such as excessive costs and complex construction.

SUMMARY OF THE INVENTION

It is a first object of the present invention to provide an ultrasonic diagnostic apparatus wherein unnecessary components in synthesized output such as side lobes can be suppressed, and a B-mode image with good resolution can be obtained.

It is a second object of the present invention to provide a synthesis circuit for converting to digital signals and synthesizing, which is inexpensive and relatively simple.

The present invention comprises a data generation circuit for generating digital complex data from received echo signals, wave-front memory for storing complex data, a circuit for reading complex data stored in the wave-front memory, and a phase correction circuit which performs a process to match the phase of the read complex data by means of complex vector phase correction according to the delay time determined by each transducer, and performs synthesis thereof.

According to such a configuration, regarding the complex data stored in the wave-front memory, a process is performed wherein the phase of the complex data which differs for each transducer is matched by means of the phase correction circuit, and then synthesis thereof is performed, thereby enabling obtaining of a B-mode image with high resolution wherein the effects of side lobes has been suppressed.

BRIEF DESCRIPTION OF THE DRAWINGS

FIG. 3 through FIG. 12 relate to a first embodiment of the present invention, FIG. 3 being an exterior view of the ultrasonic diagnostic apparatus according to the first embodiment;

FIG. 4 is a block diagram illustrating the configuration of an ultrasonic diagnostic apparatus;

FIG. 5A through 5I are explanatory drawings illustrating the operation of sequentially driving the transducers and performing transmitting and receiving of ultrasonic waves;

FIG. 6 is a circuit diagram illustrating the configuration of the phase correction circuit;

FIG. 7 is an explanatory diagram describing the operation of phase correction processing by the phase correction circuit;

FIG. 8 is an explanatory diagram describing reading following a wave-front locus;

FIG. 9A and FIG. 9B are diagrams respectively illustrating complex vectors of sample data input to the phase correction circuit and sample data following phase correction;

FIG. 10A and FIG. 10B are diagrams respectively illustrating the directional properties of a beam obtained by phase correction with a phase correction circuit, and the directional properties of a beam according to the example of prior art;

FIG. 11 is a diagram illustrating complex vectors of sample data following phase correction according to an altered example;

FIG. 12 is a diagram illustrating directional properties of a beam according to an altered example;

FIG. 14 is a side view illustrating an external ultrasonic probe;

FIG. 15 is a block diagram illustrating the configuration of a quadrature detection circuit;

DESCRIPTION OF THE PREFERRED EMBODIMENTS

The following is a detailed description of the embodiments of the present invention with reference to the drawings.

Figure 3:
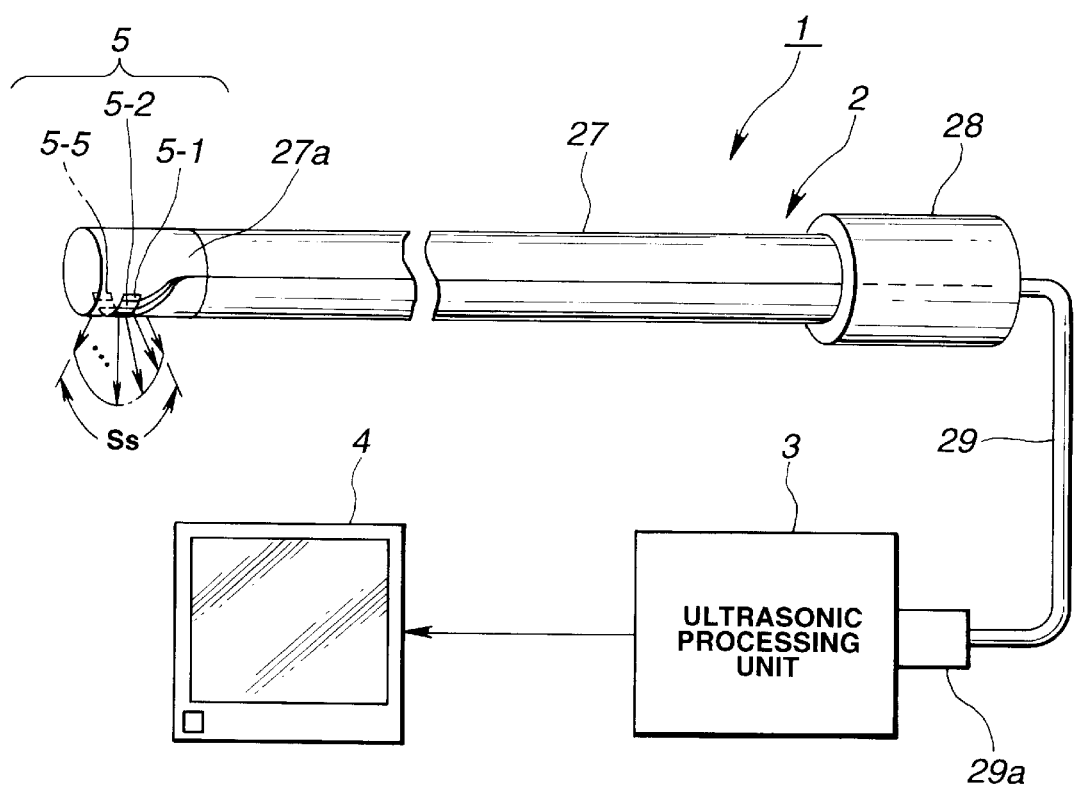

As shown in FIG. 3, the ultrasonic diagnostic apparatus 1 according to the first embodiment of the present invention is comprised of an internal-type ultrasonic probe 2 which is inserted into a bodily cavity and performs transmitting and receiving of ultrasonic waves, an ultrasonic wave processing device 3 connected to the proximal end of this ultrasonic probe, which generates transmittance driving pulses which causes excitation of ultrasonic waves and also performs signal processing of received echo signals, and a monitor 4 which displays image signals output from this ultrasonic processing device 3.

The ultrasonic probe 2 is comprised of a plurality of ultrasonic transducers (hereafter described simply as "transducers") 5-1, 5-2, and so on through 5-5, attached at a certain pitch or the like following the cylindrical surface 27a on the tip of a slender cylinder 27, thus forming an array of transducers 5.

Signal lines connected to each transducer 5-$i$ ($i$=1, 2, and so on through 5) comprised of piezoelectric devices for acoustic/electric conversion are introduced through the interior of the cylinder 27, are further introduced through a cable 29 extending from the proximal end of a grip 28 provided to the proximal end of the cylinder 27, and are connected to a connector 29a.

The connector 29a is detachably connected to the ultrasonic wave processing device 3. By means of sequentially driving the plurality of transducers 5-$i$ following the cylindrical surface of the tip portion 27, a sector-shaped ultrasonic wave scanning area Ss is scanned.

A convex type arrangement wherein the plurality of transducers 5-1, 5-2, and so on through 5-5, are provided along a convex surface.

Figure 4:
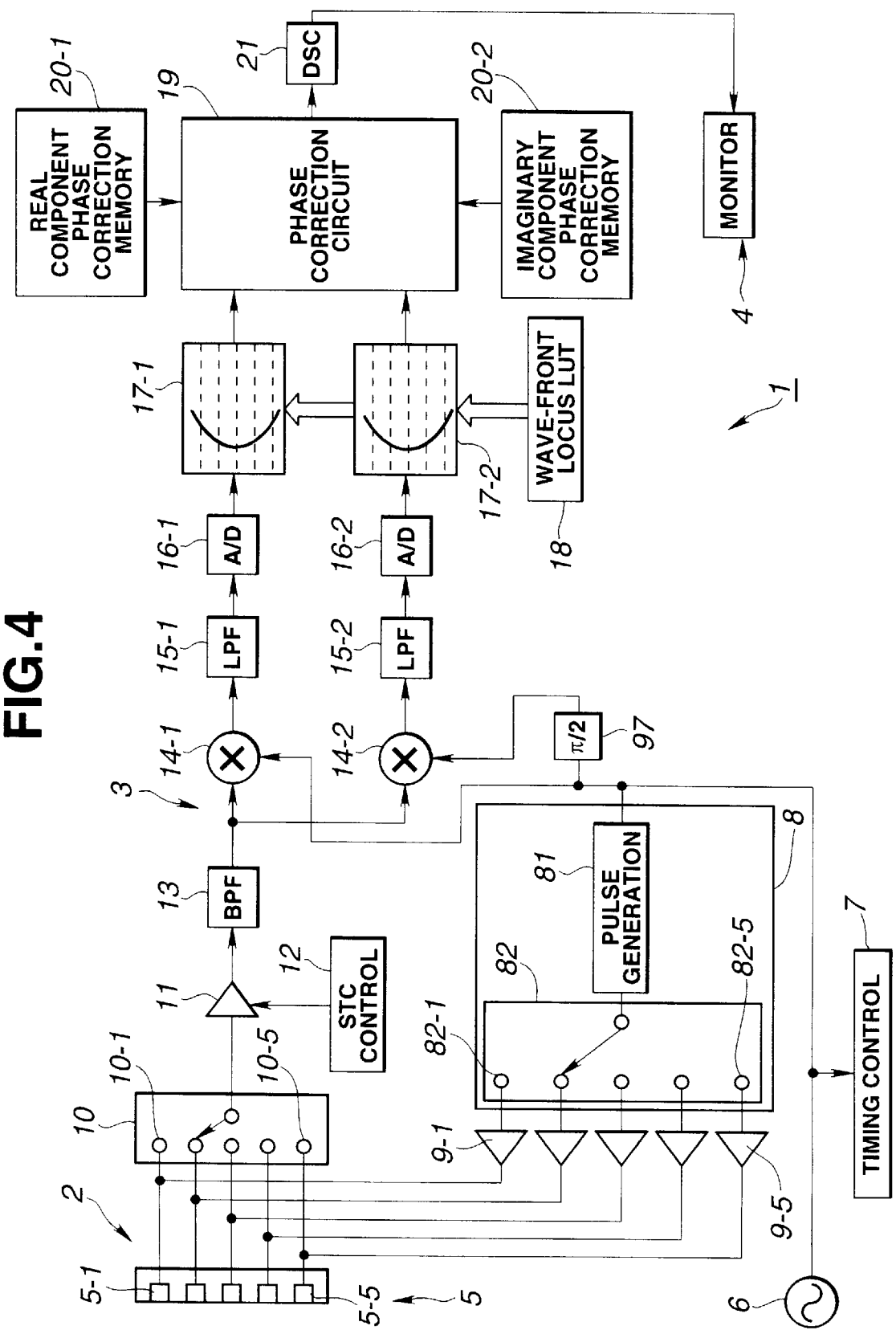

FIG. 4 illustrates the construction of the ultrasonic wave processing device 3. The signal generator 6 generates a standard signal which is sine wave of a frequency of high stability. The timing control circuit 7 generates a master clock locked in phase to the standard signal generated by the signal generator 6, and control signals (unshown) for controlling the sequence of the entire apparatus are output to each electrical circuit by means of this master clock. The standard signals generated by the signal generator 6 are also supplied to the transmission drive control circuit 8. The transmission drive control circuit 8 comprises a pulse generating circuit 81 which detects the phase of the standard signals and generates transmission drive pulse signals synchronously with this standard signal, and a multiplexer 82 which selects and outputs transmission drive pulse signals.

Further, a plurality of transmitting amplifiers 9-1 through 9-5 are connected to the output end of the transmission drive control circuit 8. One of the transmitting amplifiers 9-*i* is selected by the multiplexer 82 of the transmission drive control circuit 8, amplified transmission drive pulse signals are applied as pulses to the transducer 5-*i* connected to the selected transmitting amplifier 9-*i*, thus exciting the transducer 5-*i* for a short time and sending (emitting) ultrasonic waves in pulses into the observation object which is organs or the like within the bodily cavity.

The ultrasonic pulse or beam emitted is reflected at the changed portion of acoustic impedance, thus forming an ultrasonic echo, a portion of which is received by the transducer 5-*i*, converted into an electrical signal, and thereby becomes a (ultrasonic) echo signal or ultrasonic received signal. Each of the transducers 5-*i* are connected to a multiplexer 10 via signal lines, and the same transducer 5-*i* which is used for transmitting is selected by the multiplexer 10, and the echo signal is input to the reception amplifying circuit 11.

Now, the selection of the transducer 5-*i* by the multiplexer 82 of the transmission drive control circuit 8 and the multiplexer 10 thereof is sequentially switched synchronously with a certain timing from the timing control circuit 7. In other words, echo signals from the same transducer 5-*i* used for transmitting are input to the reception amplifying circuit 11 via the multiplexer 10.

FIG. 5A through FIG. 5I illustrate the operation of sequentially driving the transducers 5-*i* for transmitting and receiving echo signals with the same transducers 5-*i* used for transmitting.

Figure 5:
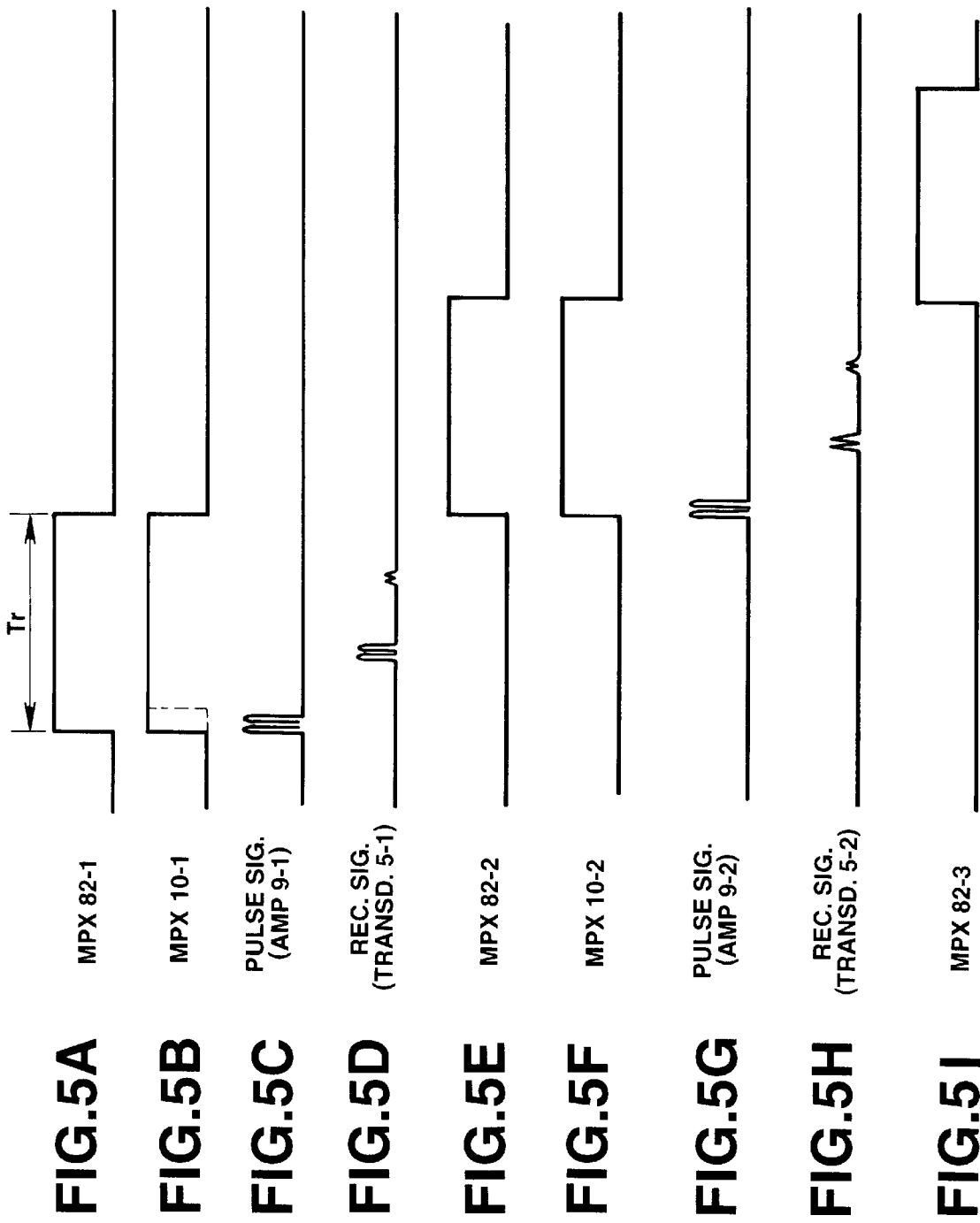

The multiplexers 82 and 10 are switched synchronously by the timing control circuit 7, and at first, e.g., terminals 82-1 and 10-1 are selected for twice the time Tr of the distance to be imaged, as shown in FIG. 5A and FIG. 5B.

Then the standard signal becomes the pulse signal (See FIG. 5C) output in the form of pulses by the pulse generating circuit 81, is amplified by the transmitting amplifier 9-1, and applied to the transducer 5-1, causing excitation thereof. Ultrasonic waves are emitted to the side of the organism due to the excitation of the transducer 5-1, and in the event that a portion exists of which the acoustic impedance greatly differs, the emitted ultrasonic waves are reflected and received by the transducer 5-1. Then, the received ultrasonic waves are converted into electrical signals, and become echo signals such as illustrated in FIG. 5D.

When the predetermined time Tr elapses, the multiplexers 82 and 10 select the next terminals 82-2 and 10-2, as shown in FIG. 5E and FIG. 5F. Then pulses are output and amplified by the transmitting amplifier 9-2 as shown in FIG. 5G, and applied to the transducer 5-2, causing excitation thereof. Ultrasonic waves are emitted to the side of the organism due to the excitation of the transducer 5-2, and in the event that a portion exists of which the acoustic impedance greatly differs, the emitted ultrasonic waves are reflected and received by the transducer 5-2. Then, the received ultrasonic waves are converted into electrical signals, and become echo signals such as illustrated in FIG. 5H.

Thus, the operation of transmitting and receiving is repeated through the transducer 5-5, thereby obtaining signal data for one frame. Subsequently, transmitting and receiving is performed again with the first transducer 5-1, and signal data for the next frame is obtained.

Each echo signal passing though the multiplexer 10 is input to the reception amplifying circuit 11. The gain control terminal of this reception amplifying circuit 11 is connected to the STC circuit 12, whereby the STC control circuit 12 performs gain control of the reception amplifying circuit 11 and performs STC.

The echo signals which have passed through this reception amplifying circuit 11 and have been amplified are input to a band pass filter (hereafter referred to as "BPF") 13, and following removal of unnecessary frequency components on the high range and low range excluding the frequency bandwidth of the standard signal, are input to multipliers 14-1 and 14-2 where quadrature detection is performed with the standard signals as reference signals.

Input to the multipliers 14-1 and 14-2 are the standard signal (as a continuous wave signal) and a standard signal which has passed through a 90° phase unit 97 which shifts the phase of the standard signal by 90°, and each multiplied with the echo signals which are input having passed through the BPF 13, and are converted into a complex signal with quadrature phase. Incidentally, the phase unit 97 which shifts the phase of the standard signal by 90° (or $\pi/2$) is denoted by "$\pi/2$" in FIG. 4.

The real signal component and imaginary signal component of the complex signal generated by quadrature detection by the multipliers 14-1 and 14-2 are each input to low-pass filters (hereafter referred to as "LPF") 15-1 and 15-2, and following removal of the carrier component from the standard signal and the harmonics component thereof, each are input to A/D converters 16-1 and 16-2 and converted from analog signals into digital signals, i.e., converted into complex data.

The digital real signal component and imaginary signal component converted by the A/D converters 16-1 and 16-2 are each stored in time-series to wave-front memories 17-1 and 17-2 which are wave-front data storage means for storing complex wave-front data from the transducers. This process is sequentially performed to each of the echo signals from the echo signal obtained from the transducer 5-1 through the signal obtained from the transducer 5-5.

Subsequently, based on address information from the wave-front locus look-up table (hereafter referred to as "wave-front locus LUT") 18, complex data components are read from the wave-front memories 17-1 and 17-2 following a wave-front locus in a positional relation for setting the point to be imaged as the focal point, the complex data components are input to the phase correction circuit 19, subjected to phase correction with reference to the phase correction information of the real component and imaginary component of the real component phase correction memory 20-1 and imaginary component phase correction memory 20-2, taking into consideration the delay time of each transducer (determined by the acoustic distance to the focal point) so that the phase is the same, and further are synthesized. This process is performed over a two-dimensional area so as to cover the area (tomography region) within the region scanned by ultrasonic scanning with the transducers of which display is desired.

The two-dimensional data of the synthesized processed data subjected to phase correction and synthesis processing is input to a digital scan converter (DSC) 21, converted into standard image signals, and then input to the monitor 4, thereby displaying an ultrasonic tomography image (B-mode image) on the monitor 4 corresponding with the image signals.

Figure 6:
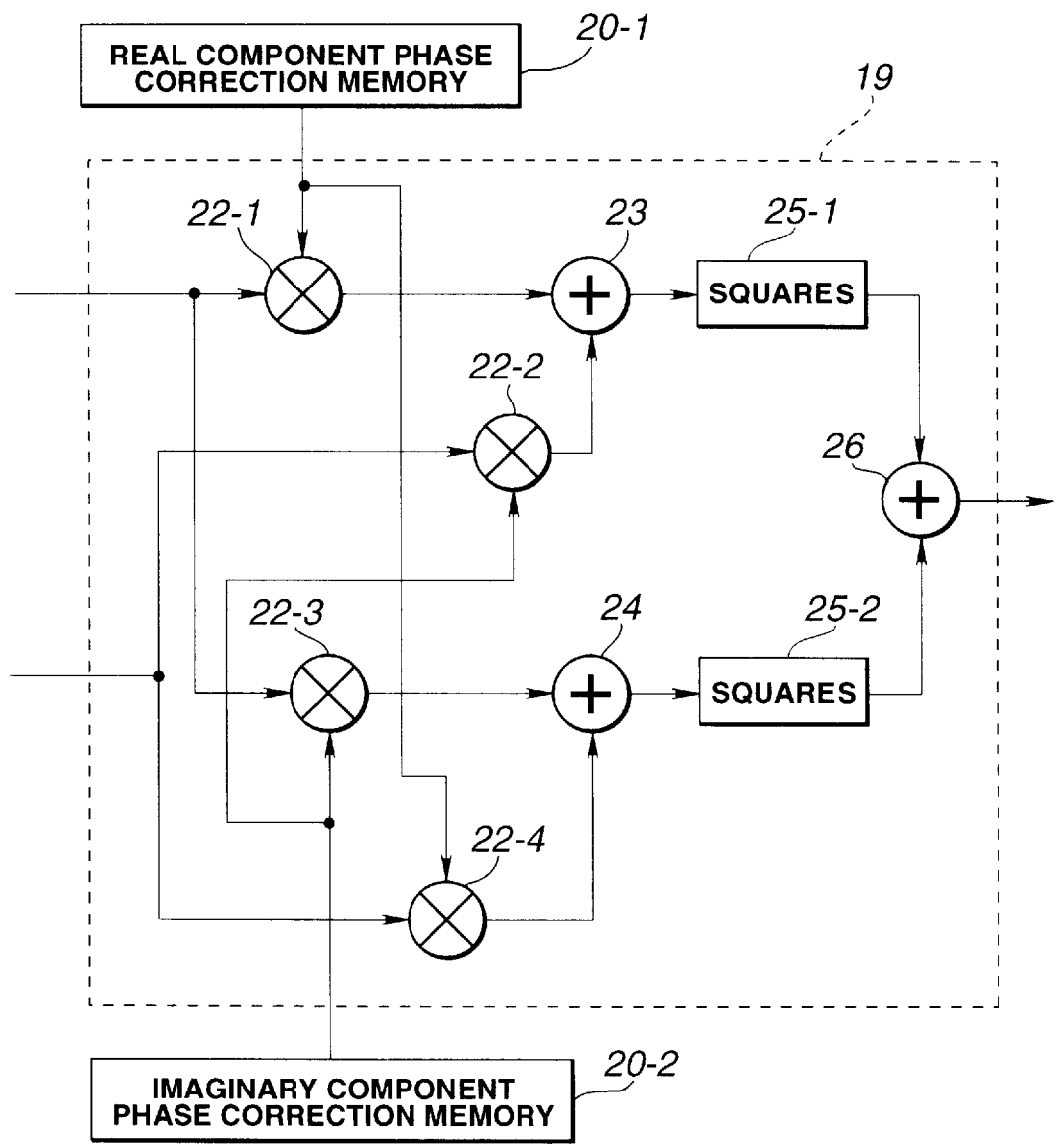

FIG. 6 shows the details of the phase correction circuit 19. As shown in the FIG. 6, the real component signal is input to the multipliers 22-1 and 22-3, and each multiplied with the phase correction information of the real component phase correction memory 20-1 and imaginary component phase correction memory 20-2. Also, the imaginary component signal is input to the multipliers 22-2 and 22-4, and each multiplied with the phase correction information of the imaginary component phase correction memory 20-2 and real component phase correction memory 20-1.

The output signals of the multipliers 22-1 and 22-3 are input to an adder 23 and added, and output signals of the multipliers 22-2 and 22-4 are input to an adder 24 and added. The outputs of the adder 23 and adder 24 are respectively input to squarers 25-1 and 25-2 which perform squaring, then further input to an adder 26 and added to perform synthesis processing, and output to the latter step side.

With the present embodiment, one characteristic of the configuration is that the echo signals received by each of the transducers 5-$i$ are subjected to quadrature detection by quadrature detection means, converted to complex signal components with low frequency, then converted to digital complex data with A/D converting means, and stored in wave-front storage means, so that low-speed A/D converting means can be used sufficiently.

Also, another main characteristic thereof is that synthesis processing including phase rotation processing (phase matching) corresponding to the delay time determined by spatial distribution and the like of each transducer to the focal point is performed regarding the complex data stored in the wave-front storage means as described above, i.e., the wave-front data.

Next, the operation of the present embodiment will be described.

With the present embodiment, first, selection of the multiplexer 82 of the transmission drive control circuit 8 and the multiplexer 10 is controlled by the timing control circuit 7, and ultrasounds are transmitted with a transducer 5-1 selected through the transmission drive control circuit 8 and the transmitting amplifier 9-1.

Next, the echo signals received and obtained by the same transducer 5-1 also selected by the multiplexer 10 are input to a reception amplifying circuit 11, and amplified to a certain degree. At this time, since the received signal grows smaller corresponding with increased distance, so STC is performed by the STC control circuit 12 so that gain is increased with time.

The output signals of the reception amplifying circuit 11 are removed of unnecessary noise components other than the signal bandwidth input to the BPF 13, following which quadrature detection is performed by the multipliers 14-1 and 14-2, and 15-1 and 15-2.

At this time, a standard signal generated by a signal generator 6 is used as the reference signal for quadrature detection. Further, the reference signal of the multiplier 14-2 is such that is subjected to 90° phase delay as compared to the reference signal of the multiplier 14-1, by means of a 90° phase unit 97. Thus, the real component of the complex signal can be calculated from the multiplier 14-1 and LPF 15-1, and the imaginary component of the complex signal can be calculated from the multiplier 14-2 and LPF 15-2.

The calculated real components of the complex signal are converted to digital data in the A/D converter 16-1 and stored in time-series to a sequentially addressed portion of the real component wave-front memory 17-1, and the imaginary components thereof are converted to digital data in the A/D converter 16-2 and stored in time-series to a sequentially addressed portion of the imaginary component wave-front memory 17-2.

Next, the multiplexer 82 of the transmission drive control circuit 8 and the multiplexer 10 switch so as to select the neighboring transducer 5-2, and in the same manner as above ultrasonic wave emission is performed, which is received by the same transducer 5-2, passing through the reception amplifying circuit 11 and BPF 13, and the complex signals obtained by quadrature detection by the multipliers 14-1 and 14-2, and 15-1 and 15-2 are converted to digital data by the respective A/D converters 16-1 and 16-2, and the real components and imaginary components are stored in time-series to a sequentially addressed portion of the wave-front memories 17-1 and 17-2. The same process is then performed through the transducer 5-5.

As described above, by means of converting received ultrasonic signals input to a quadrature detection circuit into complex signals of real component and imaginary component, the input high frequencies are converted to low frequency components. e.g., quadrature detection of a received ultrasonic signals with a center frequency of 7.5 MHz causes it to become a low-frequency signal with a 2 MHz frequency bandwidth. Accordingly, A/D converters with relatively low speed can be used for the A/D converters 16-1 and 16-2. Also, by means of performing A/D conversion to the low-frequency signals, the number of samples per signal cycle can be increased, thus reducing the phase difference between the samples.

After processing has been performed through the transducer 5-5 in the same manner, and storage has been performed to the wave-front memories 17-1 and 17-2, complex data comprising the focal point to be synthesized is extracted from the wave-front memories 17-1 and 17-2, based on an address generated by the wave-front locus LUT 18. The complex data is input to the phase correction circuit 19, and phase matching processing and synthesis processing is thus performed.

Figure 7:
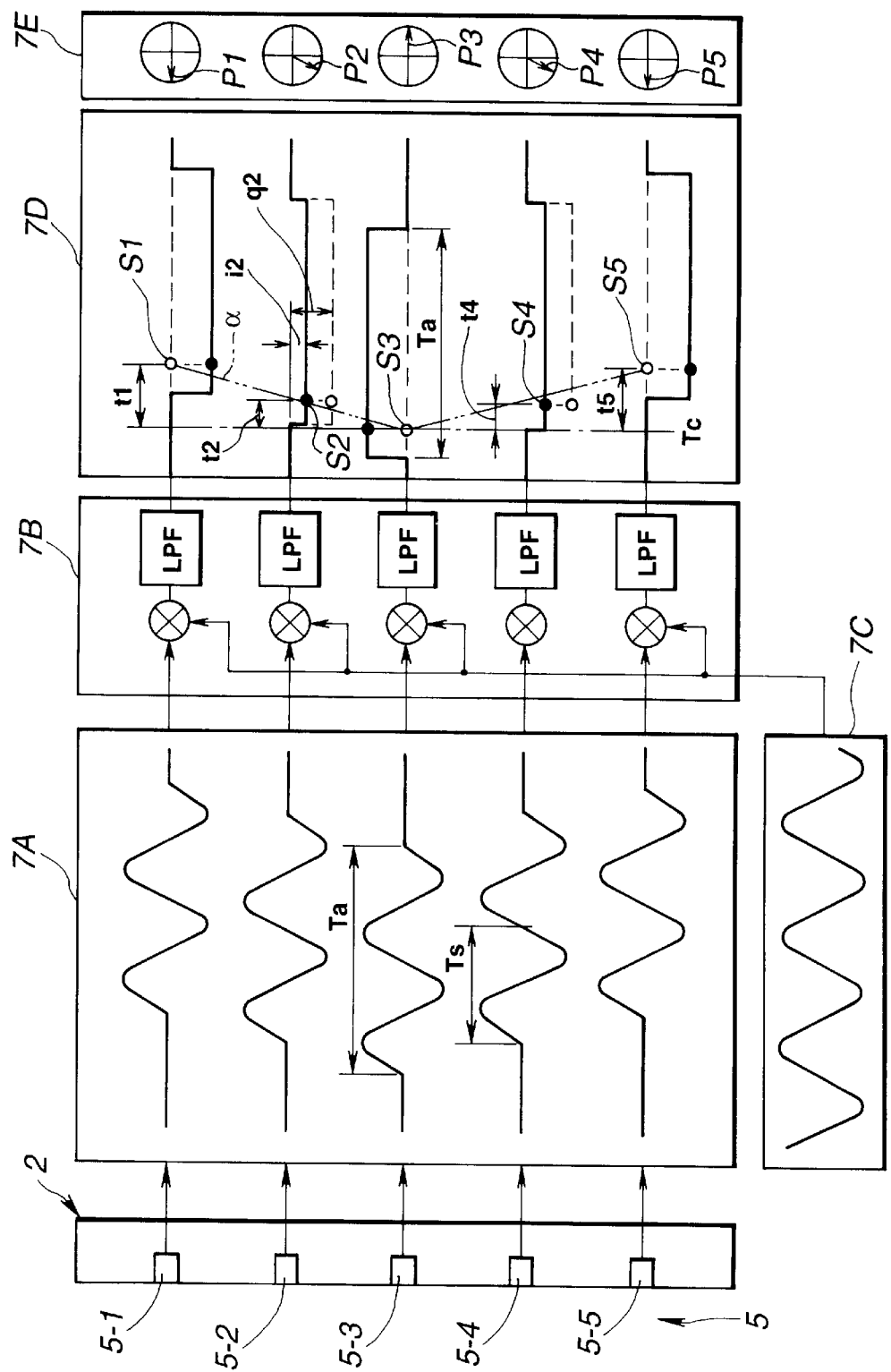

Now, the basic concept of phase correction processing performed by the phase correction circuit 19 which is another component of the present invention will be described with reference to FIG. 7. FIG. 7 is a model diagram illustrating the state of echo signals obtained by reception with transducers 5-1 through 5-5, and these echo signals being subjected to quadrature detection and stored in the wave-front memories 17-1 and 17-2. In the FIG. 7, 7A denotes received echo signals, 7B denotes a quadrature detection circuit, 7C denotes a reference signal for quadrature detection, and 7D denotes the real component and complex component stored in each of the wave-front memories 17-1 and 17-2.

Further, in 7D of FIG. 7, the solid lines represent real component, the dotted lines represent imaginary component, the solid circles represent arbitrary real component wave-front locus samples, and the blank circles represent arbitrary imaginary component wave-front locus samples. 7E is vector representation of the complex coordinates of each of the sample points in 7D.

For example, let us say that the echo signals received by the transducers 5-1 through 5-5 are of a pulse width Ta as shown in 7A of FIG. 7. Quadrature detection is performed to the echo signal received by the transducer 5-1 with the reference signal shown in 7C. This reference signal is a continuous wave and is also of the same frequency as the center frequency of the echo wave, and is synchronized with the standard signal supplied to each transducer.

The time offset between the reference signal and the echo signal shows up as change in phase, and a DC signal with a pulse width Ta as shown in 7D is obtained. Also, in the same manner regarding the other transducers 5-2 through 5-5, quadrature detection with the reference signal shown in 7C causes time offset between the reference signal and the echo signal to show up as phase change and a DC signal with a pulse width Ta as shown in 7D is obtained.

The wave-front locus a represented in 7D of FIG. 7 by a two-dot broken line corresponds to the locus of delay time determined by the ultrasonic propagation distance of each transducer 5-1 through 5-5 to the focal point to be imaged, and the echo signal on delay time represented by this wave-front locus a indicates reflected signals from the focal point which is the object thereof.

Figure 8:
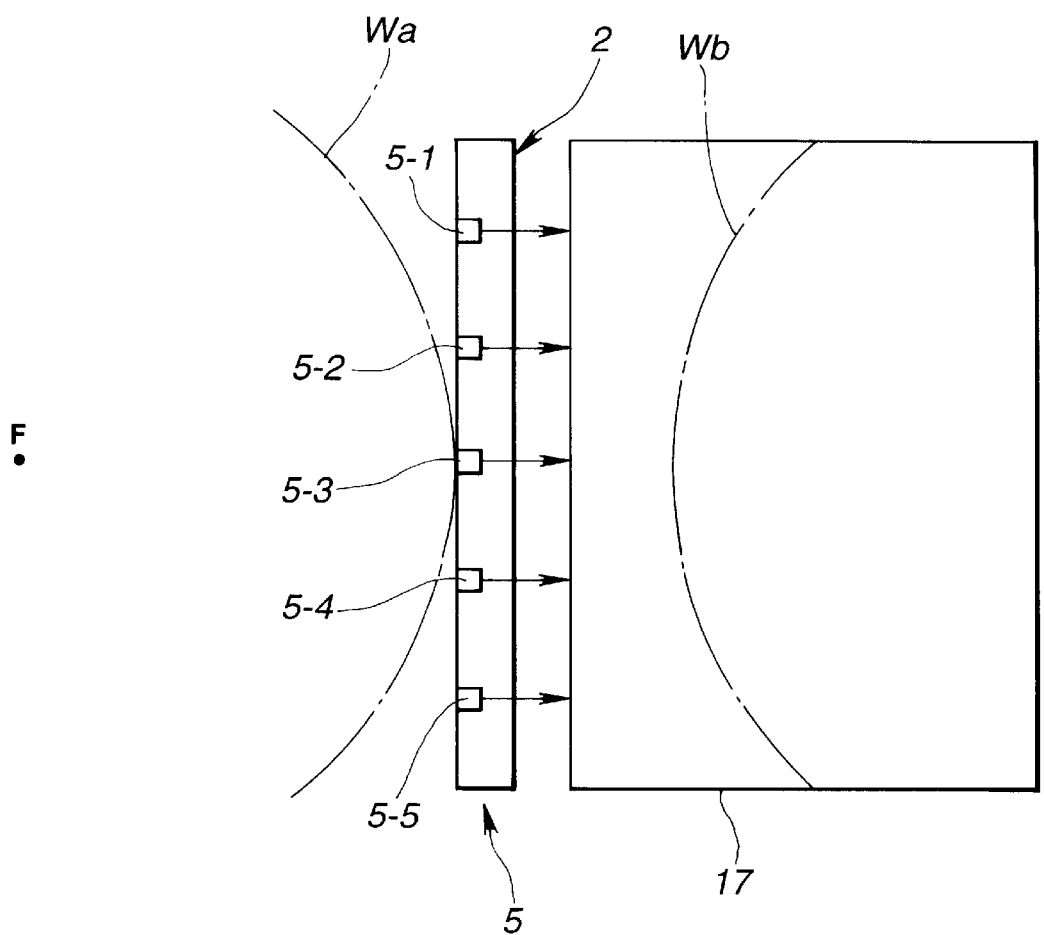

Further description of reading of the sample signals on the wave-front locus a is provided in FIG. 8.

In the event that imaging of the point F is attempted, propagation of ultrasonic waves with the point F as the focal point results in the wave-front Wa at a certain time being as shown by the single-dot broken line, and is first received by, e.g., the transducer 5-3. The other transducers receive this signal at a later time.

Accordingly, in the event of reading sample signals from the wave-front memory following a wave-front locus, sample signals are read on the wave-front memory 17 from a memory cell in the position of a wave-front Wb which is an inverted form of the wave-front Wa. In FIG. 8, the wave-front memory 17 is supposed to be sequentially storing complex data from the left side, and for sake of simplification, assumption is made that complex data of the echo signals of each of the transducers 5-$i$ are stored at the same time.

In this case, if the position of the point F is different, the reading position changes accordingly. Also, in practice the ultrasonic wave emitted from the transducer 5-$i$ has directional properties, and consequently, the amplitude is to be taken into consideration in accordance with the steering angle from an axis perpendicular to the emitting surface of the transducer 5-$i$. In reverse, this can be understood as being advantageous, in that an ultrasonic image with high resolution can be obtained without being influenced by the directional properties thereof, by means of performing phase correction corresponding to the ultrasonic wave emission properties of the transducer 5-$i$.

Returning to FIG. 7, in 7E are shown the complex vectors Pk (k=1, 2, . . . , 5) on the Gaussian plane, each vector having real, or inphase, component ik and imaginary, or quadraturephase, component qk, acquired by addressing the sampling signals Sk along the wave-front locus α. As is seen, complex vectors do not align in direction.

Simply adding the sample signals S1 through S5 on the wave-front locus α (scalar addition) will not increase the signals, since the complex vectors do not align. Accordingly, as described with the example of prior art with reference to FIG. 1 and FIG. 2, synthesis with simple addition processing only obtains an image with low resolution of low S/N.

In order to perform synthesis of high resolution based on the sample signals S1 through S5 obtained by quadrature detection, the rotation correction of each of the sample signals S1 through S5 should be performed so that the complex vectors are of the same phase and are in the same direction.

In other words, detection was made with each of the transducers 5-$i$ regarding the point F, but this had become a complex signal in the process of signal processing, and since appropriate processing had not been performed to the complex signal data with the example of prior art, the resultant beam was of low resolution.

In the specific example illustrated in 7D of FIG. 7, the sample signal S3 is set so as to be the standard for phase matching on the central sound ray of the wave-front locus α, and synthesis processing is performed. i.e., with the time at which the phase of the sample signal S3 from the transducer 5-3 becomes e.g. 0 as Tc, the delay times t1 and t2, and t3 and t4 of the remaining transducers 5-1 and 5-2, and 5-4 and 5-5 are determined by this time Tc.

Then, the phase corresponding to the delay times t1 through t5 are calculated from the following Expression (1), and set as rotation correction value phase data. With n representing the number of each transducer, tn representing each delay time, Ts representing the time of one cycle of the echo signals, and φn (°) representing the phase for rotation correction, conversion to phase is made with the following expression.

$$\phi n = \{(tn-t3)/Ts\} \times 360 \qquad (1)$$

Using the phase φn for rotation correction according to Expression (1), processing is performed to match the phase of the sample signal Sn with the standard phase of the sample S3. The phase correction circuit illustrated in FIG. 6 performs calculation according to the following Expression (2).

Now, the process for matching the phase of the sample signal Sn with the standard phase of the sample S3 is expressed as follows:

$$(In + jQn) \times An \cdot \exp(j\phi n) = \qquad (2)$$
$$\{In \cdot An \cdot \cos(\phi n) - Qn \cdot An \cdot \sin(\phi n)\} +$$
$$j \{Qn \cdot An \cdot \cos(\phi n) + In \cdot An \cdot \sin(\phi n)\}$$

wherein In represents the real component of the sample Sn, Qn represents the imaginary component thereof, φn represents the amount of phase correction, and An is an amplitude correction coefficient. Here, An=1.

The real part and imaginary part of the right-hand side of Expression (2) represent the real component and the imaginary component of the sample Sn, respectively, following phase correction.

These phase-corrected results are described as a model with reference to FIG. 9A and FIG. 9B.

FIG. 9A shows the complex data extracted from the wave-front locus α of 7D shown in FIG. 7, and FIG. 9B shows the results of phase correction performed to the data of 7D according to Expression (2). In FIG. 9A and 9B, the solid circles represent arbitrary real component, and the blank circles represent arbitrary imaginary component, with complex coordinates showing the complex vectors of each of the samples.

In comparison with FIG. 9A wherein each of the complex vectors P1 through P5 of the sample signals S1 through S5 do not align, the complex vectors P1', P2', P3, P4', and P5' of all of the samples S1', S2', S3, S4', and S5 ' are phase-matched by phase rotation so as to agree with the direction of the complex vector P3.

Figure 1:
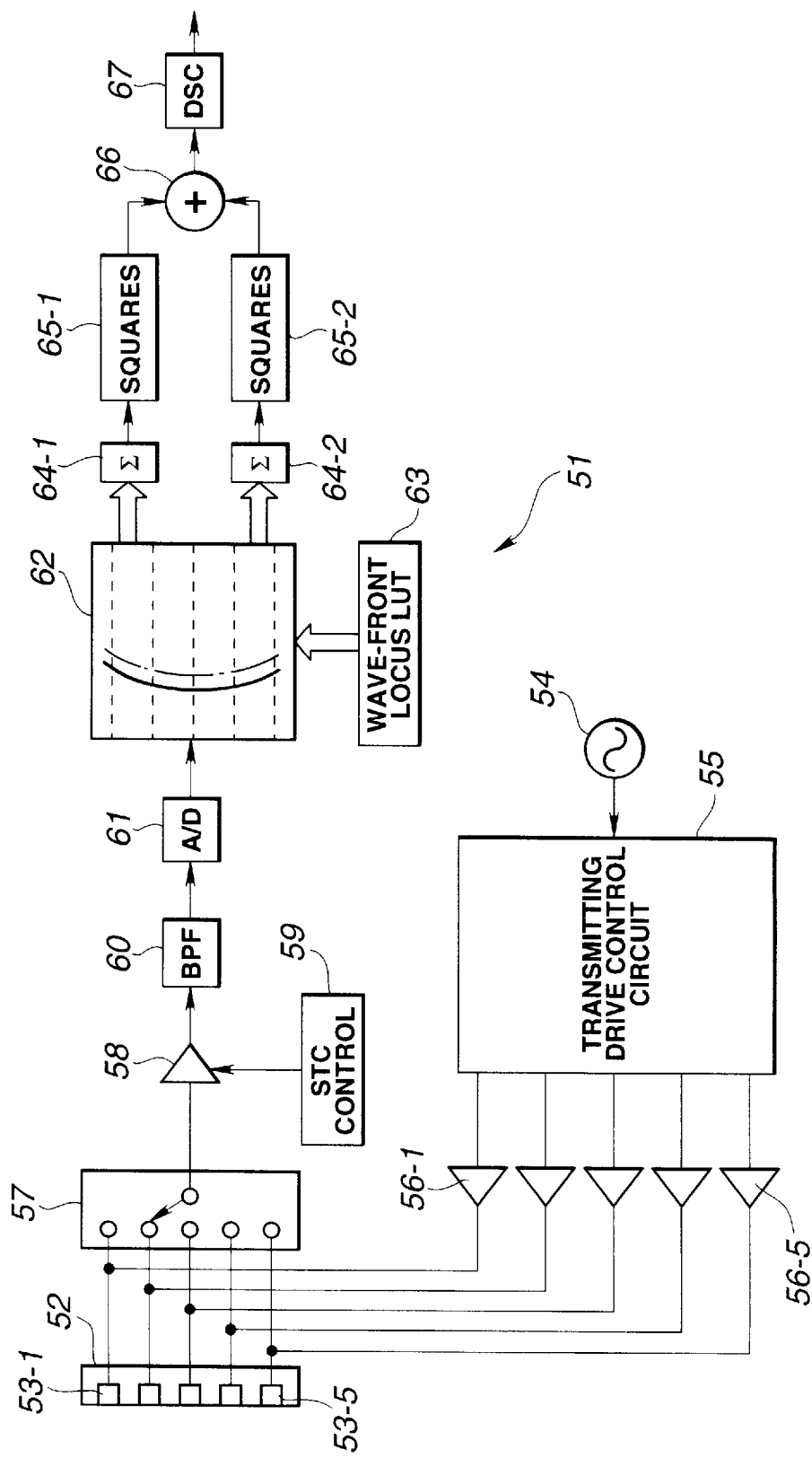
FIG. 1 is a diagram illustrating an example of the configuration of an ultrasonic diagnostic apparatus of prior art which employs the aperture synthesis method.
Figure 2:
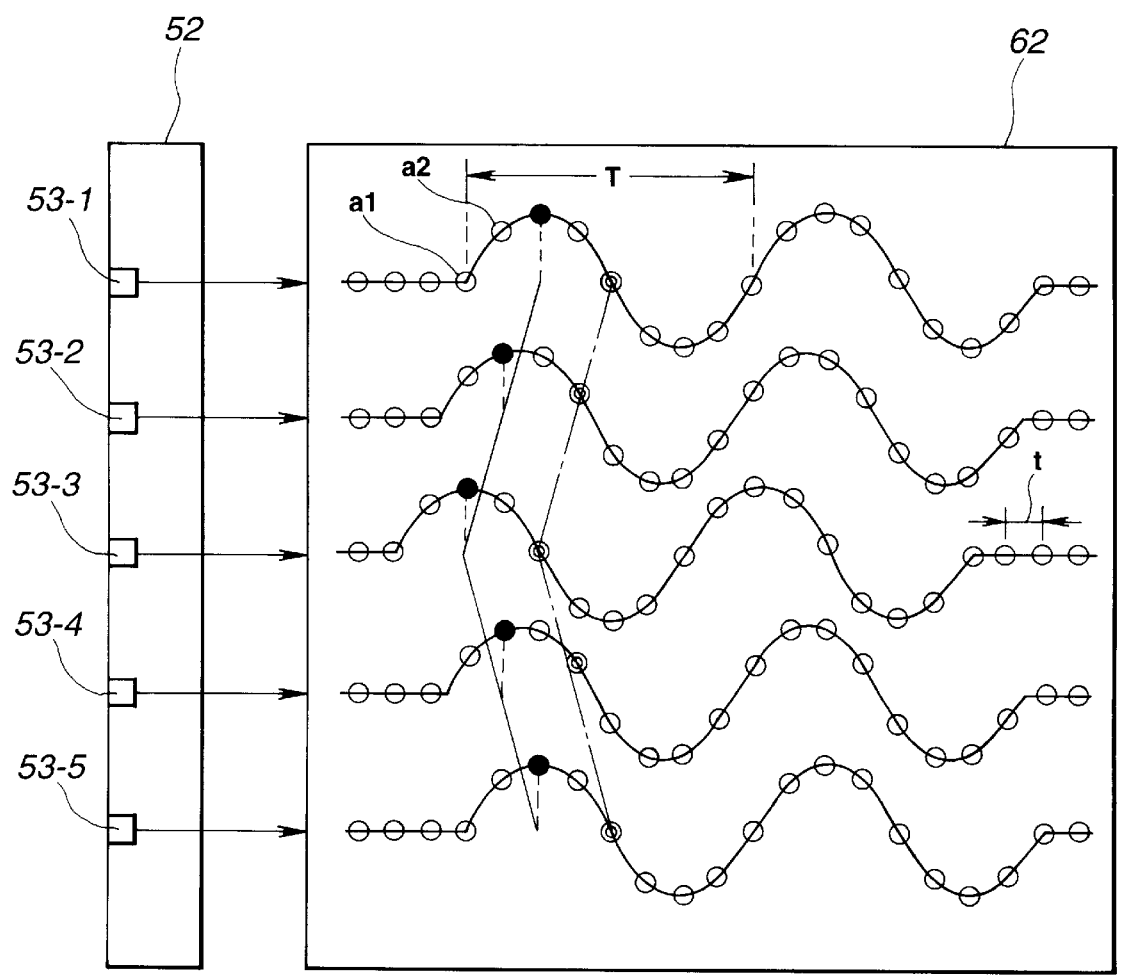
FIG. 2 is a diagram illustrating the B-mode synthesis method according to an example of prior art.

With the synthesis method wherein synthesis is performed with phase rotation correction, the phase precision is extremely high since the phase can be directly operated in a vector manner, and ideal synthesis is possible as compared to the synthesis method according to the quadrature sampling method of the example according to prior art described with reference to FIG. 1.

With such a synthesis method, the beam directional properties of the calculated power component becomes beam properties with sharp directional properties of which unnecessary components such as side lobes are suppressed, as illustrated in FIG. 10A, (synthesis with each observation point of the ultrasonic tomography area as a focal point is performed) and in the event that this is displayed on the monitor 4 via the DSC 21, a clear B-mode image with high resolution and few effects of side lobes is obtained.

Also, FIG. 10B shows the beam properties obtained by the example of the prior art for purposes of comparison, in which the side lobes are great, and the directional properties are wide. In FIG. 10A and FIG. 10B, the power of the synthesized power component is schematically illustrated as dB as to the angle q of the horizontal axis.

More specifically, the phase precision in the event that synthesis is performed only taking delay time into consideration as with the example of prior art is around 45°, but according to the synthesis means or synthesis method wherein phase correction according to the present embodiment is performed, an apparatus with far higher phase precision of 2° to 3° can be easily constructed.

Also, according to the synthesis method according to the present embodiment, conversion to low-frequency waves is performed and phase rotational correction is performed to the complex data stored in the wave-front storage means, so that circuit devices of lower speeds can be used as compared to cases of high-frequency data wherein the echo signals are directly digital-converted, and further, the effects of inductance of the wiring pattern and floating capacity thereof is decreased, facilitating phase correction with a more simple circuit construction.

Returning to FIG. 7 once more, further description will be made regarding the present embodiment. Since the calculation of phase correction shown in Expression (2) cannot be performed in real time in actual practice, cos ($\phi$) and sin ($\phi$) of Expression (2) which match the time of the wave-front locus stored in the wave-front locus LUT 18 are calculated beforehand, with each being made to be real component phase correction data and imaginary component phase correction data, with the real component phase correction data being stored to the real component phase correction memory 20-1 and the imaginary component phase correction data being stored to the imaginary component phase correction memory 20-2.

In actual processing the real component is read from the wave-front memory 17-1 and the imaginary component is read from the wave-front memory 17-2, by means of the wave-front locus LUT 18, with the real component and imaginary component phase correction data being read from the real component phase correction memory 20-1 and the imaginary component phase correction memory 20-2.

Regarding the read real component and imaginary component, the real component and the real component phase correction data are multiplied by the multiplier 22-1, and the imaginary component and the imaginary component phase correction data are multiplied by the multiplier 22-2, the results thereof are added by the adder 23, and squaring computation is performed by the squarer 25-1, thereby obtaining the real component with phase correction.

Also, the real component and the imaginary component phase correction data are multiplied by the multiplier 22-3, and the imaginary component and the imaginary component phase correction data are multiplied by the multiplier 22-4, the results thereof are added by the adder 24, and squaring computation is performed by the squarer 25-2, thereby obtaining the imaginary component with phase correction.

These results are added by the adder 26, thereby calculating the power component of the reflected signal at the observation point.

The power component calculation is performed with each observation point on the ultrasonic tomography plane as the focal point, the calculated power component is output to the DSC 21, the DSC 21 performs processing such as coordinates conversion and interpolation, thereby generating a B-mode image signal which is output to the monitor 4.

According to the above description, the size of the amplitude correction coefficient is constant, but there is no need to be restricted to such; the size of the amplitude correction coefficient may be changed so as to perform weighting, as described in the following altered example.

For example, in the process of matching the complex vectors P1, P2, P4, and P5 of the sample signals S1, S2, S4, and S5 to match the direction of the complex vector P3, phase matching can be performed wherein the amplitude correction coefficient for each of the samples is changed so that input of the complex vectors P1 and P5 of the sample signals S1 and S5 which are on the perimeter (both edges) at the greatest distance from the sample signal S3, with the complex vector S3 of the sample signal S3 serving as the center. As a result, as shown in the complex coordinates of FIG. 11, the size of the complex vector P3 is the greatest and the size decreases toward the complex vectors P1 and P5 toward either edge.

Thus, by means of making the complex vector P3 of the center sample signal S3 serving as the standard to be central and greatest by changing the size of the amplitude correction coefficient, and making the complex vectors P1 and P5 of the signals S1 and S5 to the edges of the wave-front locus to be small, weighting effects are obtained, and as shown in FIG. 12, beam directional properties can be made to be such wherein the side lobe components are suppressed (even further than the example of FIG. 10A), thus obtaining a B-mode image with the side lobes suppressed even further than the case wherein only phase correction is performed.

According to the above description, the number of transducers has been described as five for the sake of simplifying description, but the configuration often involves 64 or more transducers in actual practice, and the present invention is not limited to the number of transducers.

For example, in the event of changing the size of the aforementioned amplitude correction coefficient An and performing weighting, a general description would involve making the amplitude correction coefficient great for the echo signal (also known as "sound ray") obtained by the center or central transducer, and weighting is performed such that the amplitude correction coefficient grows smaller for the sound rays of the transducers in accordance with increased distance from this center or central transducer.

Figure 13:
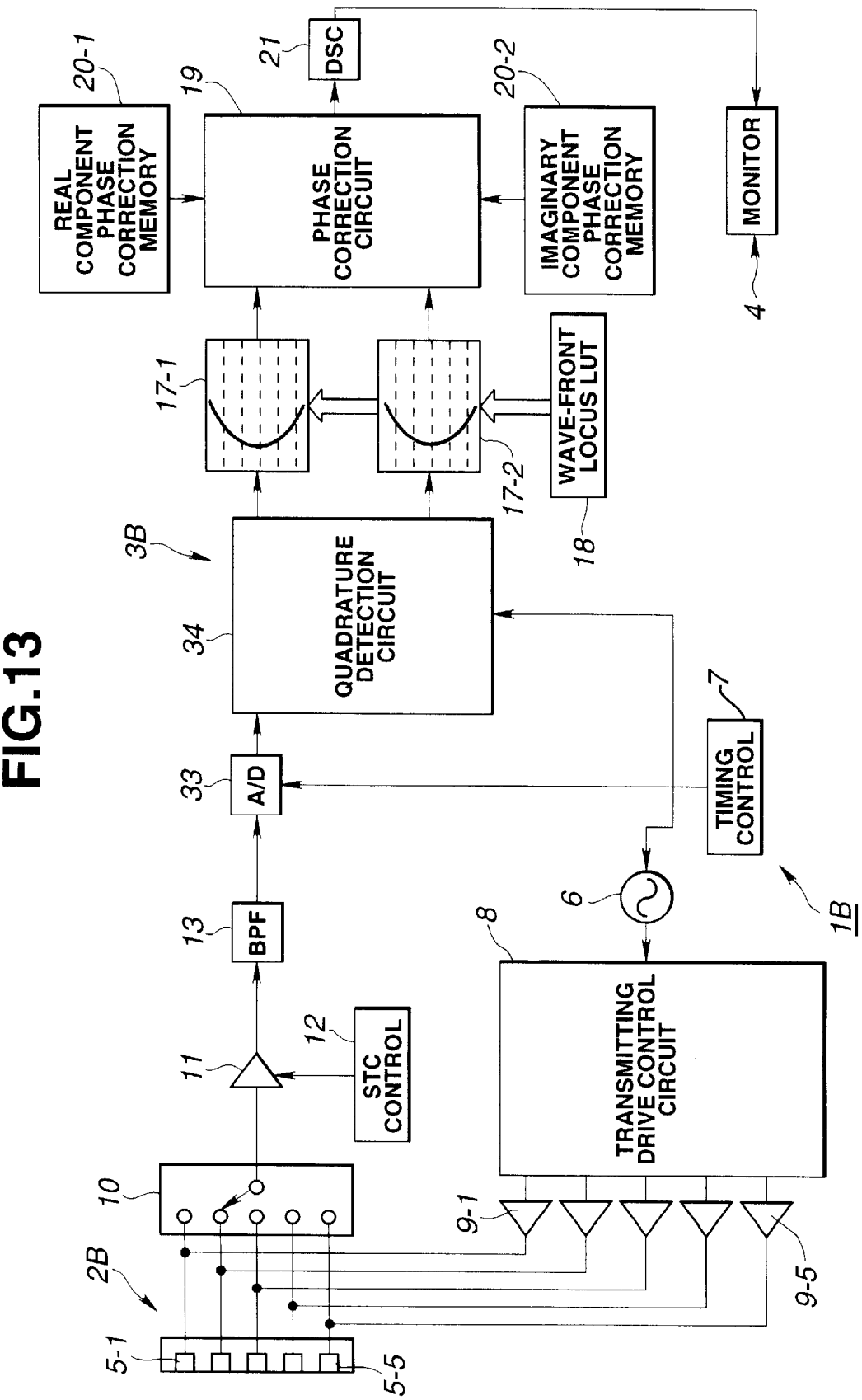
FIG. 13 through FIG. 15 relate to a second embodiment of the present invention, with FIG. 13 being a block diagram illustrating a second embodiment of the configuration of an ultrasonic diagnostic apparatus.
Figure 14:
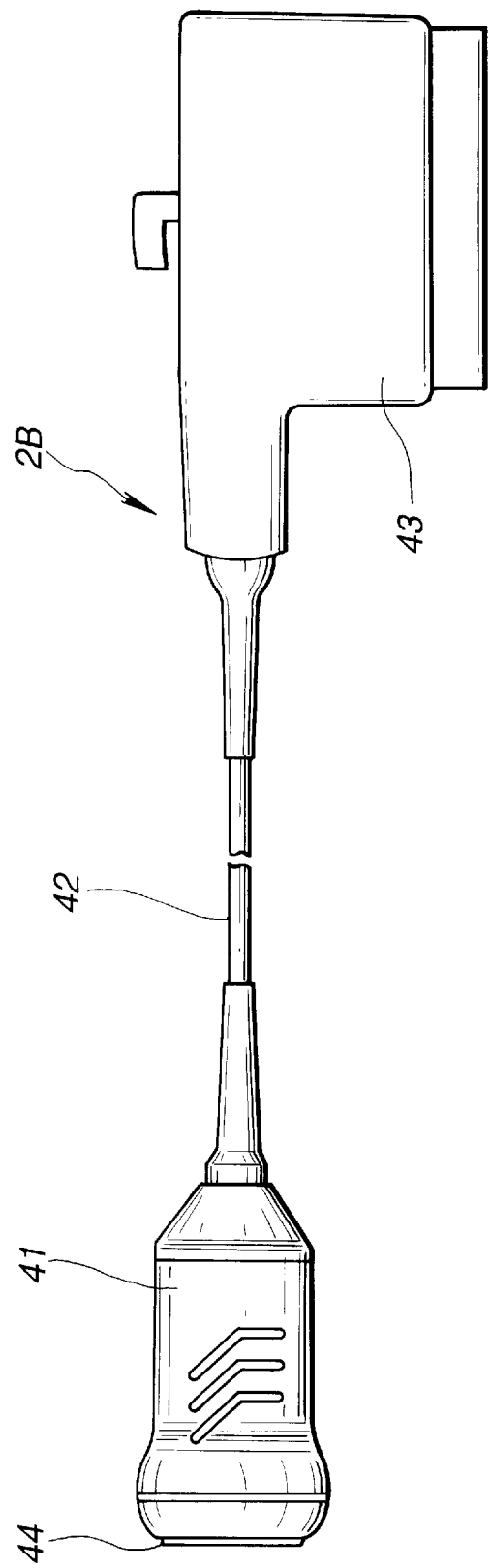
Figure 15:
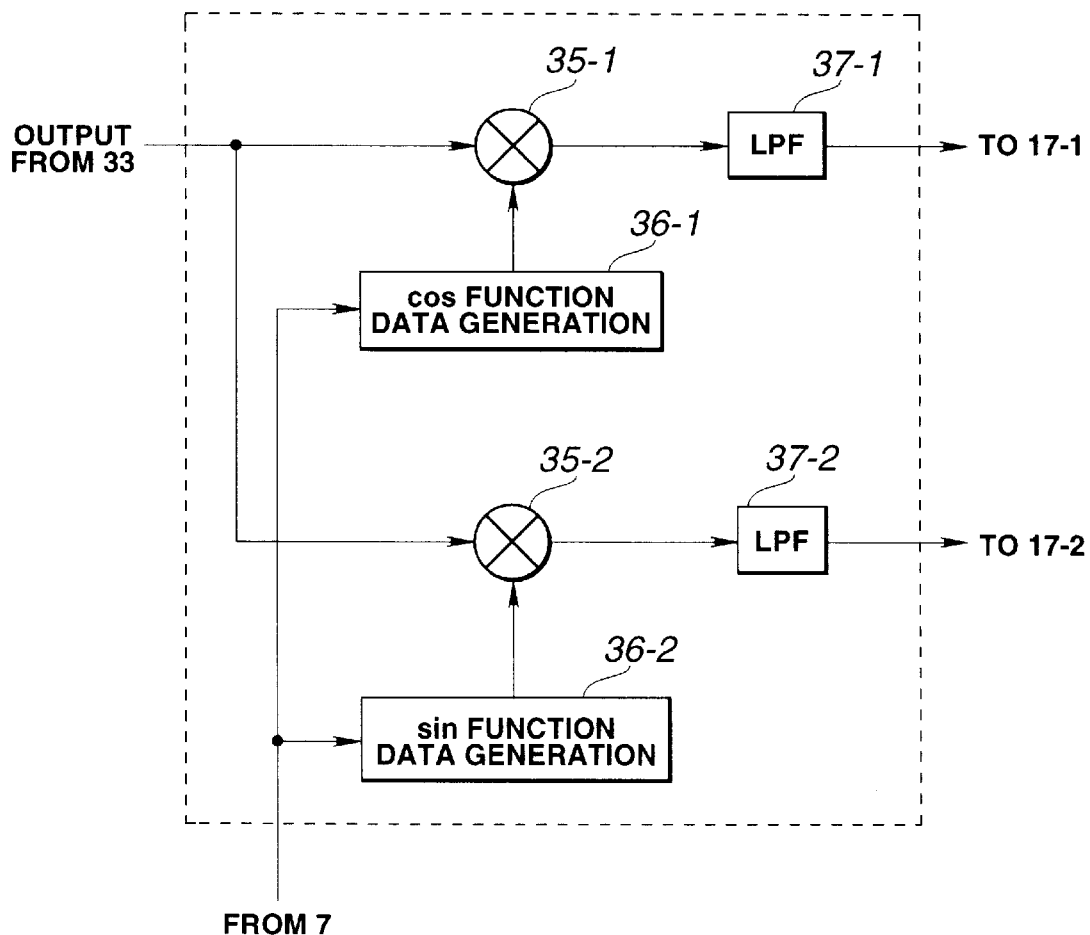

Next, a second embodiment of the present invention will be describe with reference to FIG. 13 through FIG. 15.

With the first embodiment, analog ultrasonic echo signals were subjected to quadrature detection by means of multipliers 14-1 and 14-2 and LPFs 15-1 and 15-1 comprised of analog circuit devices, thereby generating complex signals and subsequently generating digital complex signals with the two A/D converters 16-1 and 16-2. In this case, the advantage is that A/D converters with slow speed could be used for the A/D converters 16-1 and 16-2.

In this case, there are irregularities between the analog circuit devices, requiring adjustment. Since such adjustment becomes troublesome, the object of the present embodiment is to obtain a B-mode image of good image quality in which side lobes are suppressed, by means of using a digital quadrature detection circuit.

The ultrasonic diagnostic apparatus 1B according to the second embodiment as illustrated in FIG. 13 is comprised of, e.g., an internal-type ultrasonic probe 2B, and an ultrasonic wave processing device 3B of which the configuration is partially different from that of the ultrasonic wave processing device 3 shown in FIG. 4.

As shown in FIG. 14, the ultrasonic probe 2B is comprised of a probe body 41 with built-in transducers 5-1 through 5-5 (See FIG. 13), an ultrasonic wave cord 42 containing signal transmitting lines connected to the transducers 5-1 through 5-5 introduced extending from the proximal end of this probe body 41, and are connected to a probe connector 43. The probe connector 43 is detachably connected to the ultrasonic wave processing device 3B.

An acoustic lens 44 is provided to the ultrasonic wave receiving side of the probe body 41, and the ultrasonic waves sequentially emitted from the transducers 5-1 through 5-5 arrayed in upward and downward directions in FIG. 14, for example, pass through this acoustic lens 44, and are transmitted into the body tissue pressed against this acoustic lens 44. Grooves for preventing slippage are also formed on the outside of the probe body 41.

According to the ultrasonic wave processing device 3 in FIG. 4, the ultrasonic wave processing device 3B shown in FIG. 13 is arranged such that the output signals of the BPF are input to the A/D converter 33 and converted to digital echo signals, following which the signals are input to a digital quadrature detection circuit 34, thus generating digital complex signal data.

Then, the digital complex signal data are each stored in respective wave-form memories 17-1 and 17-2.

The timing control circuit 7 generates synchronous signals which are output to the signal generator 6, A/D converter 33, and quadrature detection circuit 34, and process is performed with each synchronized.

As shown in FIG. 15, the quadrature detection circuit 34 is comprised of first and second multipliers 35-1 and 35-2, a cos function data generating circuit 36-1 and sin function data generating circuit 36-2 for respective generation of quadrature cos function data and sin function data, and LPFs 37-1 and 37-2 for removing unnecessary data from the high range side of the output data from the first and second multipliers 35-1 and 35-2. These LPFs 37-1 and 37-2 are realized by means of digital filters such as FIR (Finite Impulse Response) filters or the like.

The output signal of the A/D converter 33 and the output data of the cos function data generating circuit 36-1 are input to the first multiplier 35-1, and following multiplication thereof, detection thereof is performed by means of removing unnecessary data from the high range side thereof with the LPF 37-1 and real component is extracted. Then, this real component is stored to the wave-front memory 17-1.

Also, the output signal of the A/D converter 33 and the output data of the sin function data generating circuit 36-2 are input to the second multiplier 35-2, and following multiplication thereof, detection thereof is performed by means of removing unnecessary data from the high range side thereof with the LPF 37-2 and imaginary component is extracted. Then, this imaginary component is stored to the wave-front memory 17-2.

With the embodiment of the present invention, an A/D converter 33 with a high conversion rate becomes necessary, but since a digital quadrature detection circuit 34 can be employed, effects of irregularity of circuit devices as in the case of an analog quadrature detecting circuit are almost non-existent. In other words, quadrature detecting at high precision can be performed with practically no adjustment.

Further, the same can be achieved with circuitry of a smaller scale. Other effects and advantages of the present embodiment are almost the same as those of the first embodiment.

A third embodiment of the present invention will now be described with reference to FIG. 16 and FIG. 17.

With the above-described embodiments, transmitting and receiving was performed in a time-series manner with a plurality of arrayed ultrasonic transducers, thus obtaining echo signals by ultrasonic transducers at differing positions.

As compared to this, the present embodiment involves obtaining echo signals the same as with the above-described embodiments, using a single ultrasonic transducer.

Figure 16:
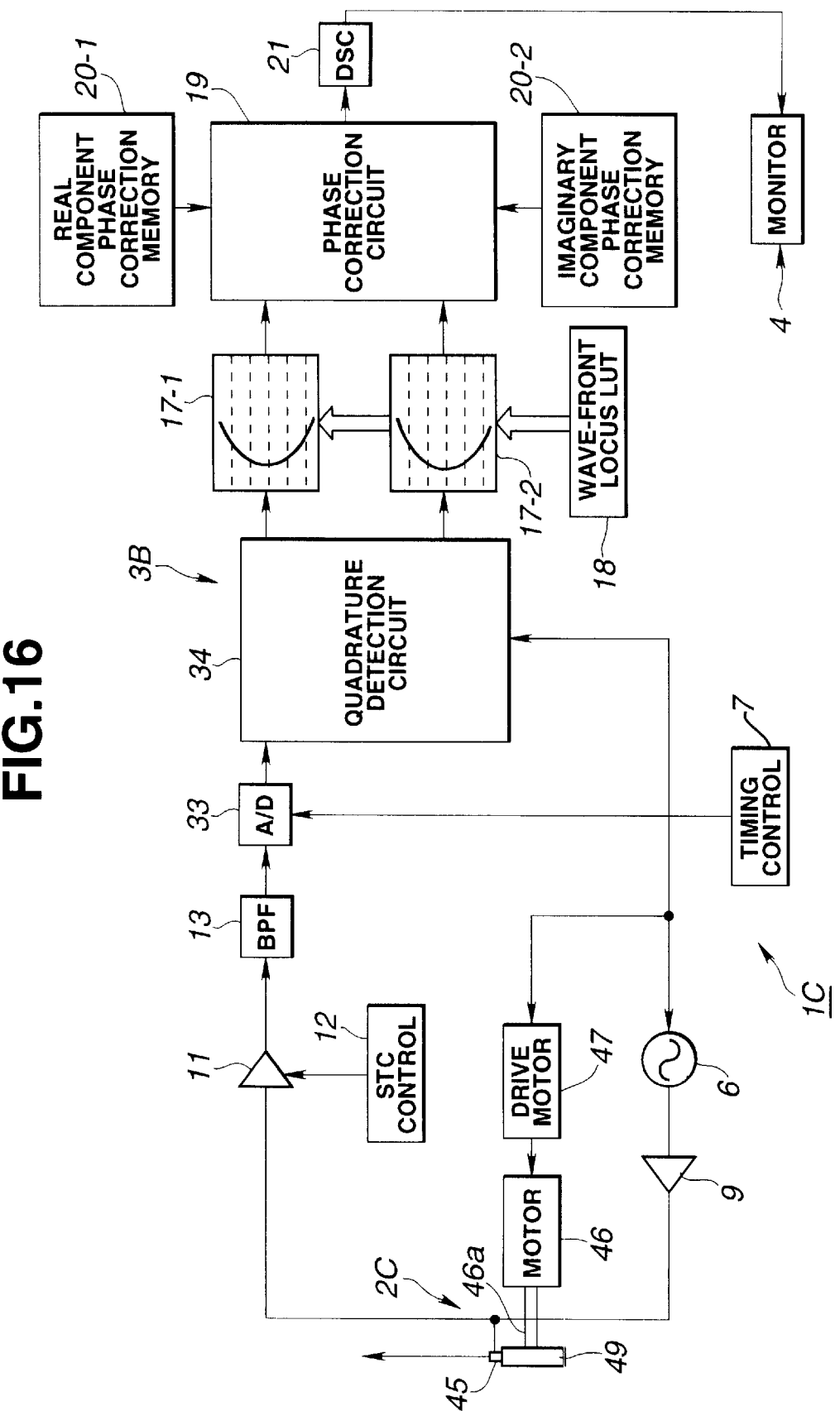
FIG. 16 and FIG. 17 relate to a third embodiment of the present invention, with FIG. 16 being a block diagram illustrating a third embodiment of the configuration of an ultrasonic diagnostic apparatus.

Specifically, as shown in FIG. 16, an ultrasonic transducer 45 comprising an ultrasonic probe 2C is driven with a motor 46, whereby ultrasonic waves are emitted from and received by the ultrasonic transducer 45 at various differing positions.

Motor driving signals are applied to the motor 46 by a motor driving circuit 47. This motor driving circuit 47 is applied with synchronous signals from the timing control circuit 7, and the motor 46 outputs step-type motor driving signals synchronously with this signal.

Synchronously this the motor driving signals, the signal generator 6 applies standard signals to the ultrasonic transducer 45 via the transmitting amplifier 9, causing transmission of ultrasonic waves, and at the same time outputs the received and acoustic/electric conveyed echo signals to the reception amplifying circuit 11. The processes following this reception amplifying circuit 11 is the same as the signal processing described in FIG. 13, and the reference numerals are the same as well.

Figure 17:
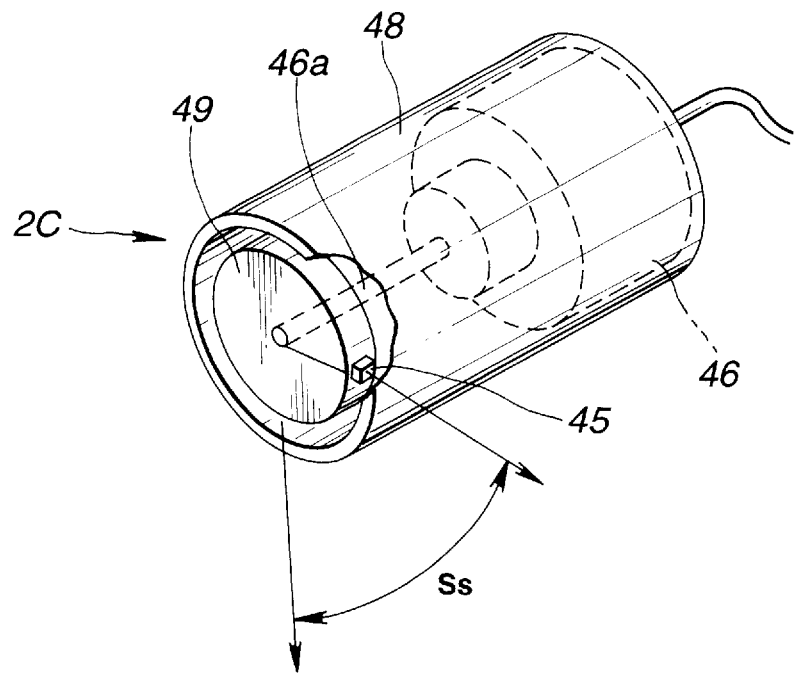

FIG. 17 illustrates an ultrasonic probe 2C, wherein the ultrasonic transducer 45 is rotated by the motor 46. The motor 46 is stored within the cylindrical tube 48 with the stator side thereof being fixed, a round plate member 49 is attached to the tip of the rotating shaft 46a protruding having been sealed with a sealing member, and the ultrasonic transducer 45 is attached to the cylindrical plane of this round plate member 49. The tube 48 is filled with a liquid which conveys ultrasonic waves.

The position of the ultrasonic transducer 45 moves following an arc which is of length approximately the radius of the round plate member 49 by means of rotation of the motor 46, and scans a sector-shaped ultrasonic wave scanning area Ss, for example. Further, at least the portion of the tube 48 corresponding to this sector-shaped ultrasonic wave scanning area Ss is made into an acoustical window formed of a material such as plastic which allows transmission of ultrasonic waves.

Also, the signal lines connected to the ultrasonic transducer 45 are passed through the hollow rotating shaft 46a and connected to non-rotating signal lines via an unshown transmitting member such as a slip ring attached to the inner space of the motor 46. In the event that the motor 46 is to be rotated in a vibrating manner, intervention of a transmitting member such as a slip ring is not necessary.

The present embodiment uses a single ultrasonic transducer 45 and changes the position thereof to perform transmitting and receiving of ultrasonic waves, thereby obtaining an image the same as an image obtained by arraying a plurality of ultrasonic transducers.

Also, a linear motor may be used instead of the motor 46 so as to drive the ultrasonic transducer 45 in a linear manner, thereby obtaining a linear-scan ultrasonic transducer tomography image.

Figure 18:
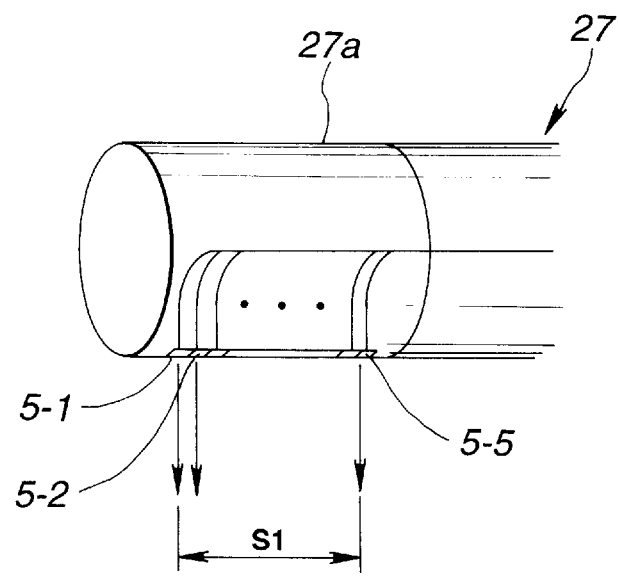
FIG. 18 is a constructional diagram illustrating the leading tip side of an internal linear scanning ultrasonic probe.

Also, a plurality of ultrasonic transducers 5-1, 5-2, and so on through 5-5 may be attached in the longitudinal direction of the cylindrical surface as shown in FIG. 18. by means of sequentially driving the plurality of ultrasonic transducers 5-*i* with this arrangement, a linear ultrasonic scanning area S1 is scanned, thereby obtaining a linear scan ultrasonic transducer tomography image. Further, a plurality of ultrasonic transducers may be arranged along a convex surface or a flat surface or an arc-shaped surface and obtaining an ultrasonic transducer tomography image by sequentially performing time-series transmitting and receiving with the ultrasonic transducers.

Further, in order to obtain complex signal data, the arrangement described with reference to the first embodiment involved a construction wherein A/D conversion is performed following analog quadrature detection, and the arrangement described with reference to the second embodiment involved a construction wherein digital quadrature detection is performed following A/D conversion, but an arrangement may also be used wherein complex data is obtained using quadrature sampling.

For example, in the ultrasonic diagnostic apparatus 1B illustrated in FIG. 13, the A/D converter 33 and quadrature detection circuit 34 are replaced with a quadrature sampling circuit which performs sampling of the echo signal which has passed through the BPF 13 with two sampling pulses synchronous with the cycle of the standard signal and mutually offset by ¼ cycle, and an A/D conversion circuit which performs A/D conversion of the two sampled signal series.

In other words, echo signals are sequentially sampled at the timing of t=mT/2 (T=2π/ωo, wherein ωo denotes the angle frequency of the standard signal and m is an integer) and a signal corresponding to the real component is obtained, and in the same way a signal corresponding to the imaginary component is obtained at a timing offset by T/4 from this timing t, i.e., by sequentially sampling echo signals at the timing of t=mT/2+T/4, and by performing A/D conversion of these signals, complex signal data can be obtained. In practice, correction of the factor of (−1) to the m-th power is also taken into consideration, as shown in the Expressions (11) and (12) of the following literature.

Using the above-described means or method is advantageous in that mixed means (specifically, the multipliers 35-1 and 35-2 shown in FIG. 15) are not necessary.

Obtaining complex signal data using this quadrature sampling method is described in, e.g., "Ultrasound Phased Array Delay Lines Based on Quadrature Sampling Techniques", JEFFREY E. POWERS et al., IEEE Trans. Sonics and Ultrasonics, vol. SU-27 No. 6, (1980) pp. 287–294.

Also, with the first embodiment, for example, description has been made regarding an ultrasonic diagnostic apparatus employing the aperture synthesis method wherein each transducer of the array of transducers 5 is driven one at a time according to time-division and synthesis of the obtained echo signals is performed, wherein phase precision of the synthesis is improved by phase rotation, but the present invention is by no means limited to the aperture synthesis method; rather, the present invention may also be applied to ultrasonic diagnostic apparatuses wherein a plurality of transducers perform transmitting and receiving at almost the same time to perform synthesis.

With the above-described aperture synthesis method, reception of the transducers 5-1 through 5-5 can be time-divided, thereby necessitating only one quadrature detection circuit. On the other hand, with ultrasonic diagnostic apparatuses using a plurality of transducers for simultaneous driving and receiving, a number of quadrature detection circuits equal to that of the transducers being driven simultaneously becomes necessary.

Also, a high-speed computation processor represented by Digital Signal Processors (DSP) may be used for the phase correction circuit 19, although the computation speed will be decreased somewhat.

Further, the embodiment of the present invention are not limited to linear scanning or sector scanning, but can also be applied to ultrasonic probes using ultrasonic scanning methods such as radial scanning and others.

Moreover, embodiments constructed by partial combination of the above embodiments and the like also belong to the present invention.

What is claimed is:

1. An ultrasonic diagnostic apparatus, comprising:
   an ultrasonic transducer array having a plurality of ultrasonic transducers;
   a complex data generation circuit for sequentially driving said plurality of ultrasonic transducers with driving signals in synchronism with a standard signal and also generating digital complex data from echo signals received respectively with the same ultrasonic transducer;
   memory for storing said complex data;
   a phase correction circuit for reading the complex data stored in said memory, and performing complex vector phase correction so as to match the real component data and imaginary component data which form a pair in said complex data to a single standard phase, according to the delay time determined by the positional relation of each ultrasonic transducer; and
   a synthesis processing circuit for performing synthesis processing in order to calculate reflection intensity from each of the complex data subjected to matching by said phase correction circuit.

2. The ultrasonic diagnostic apparatus according to claim 1, wherein said complex data generation circuit further comprises a quadrature detection circuit which performs quadrature detection of said echo signals and generates complex signals, and an A/D converting circuit which A/D converts quadrature-detected complex signals and generates said complex data.

3. The ultrasonic diagnostic apparatus according to claim 1, wherein said complex data generation circuit further comprises an A/D converting circuit which A/D converts said echo signals, and a quadrature detection circuit which performs quadrature detection of A/D converted digital echo signals and generates said complex data.

4. The ultrasonic diagnostic apparatus according to claim 1, wherein said complex data generation circuit synchronizes with the cycle of said standard signal regarding said echo signal, and further comprises a quadrature sampling circuit which samples with two sampling pulses which are mutually offset by ¼ cycle, and an A/D conversion circuit which performs A/D conversion of each of the two sampled signal series.

5. The ultrasonic diagnostic apparatus according to claim 1, wherein said ultrasonic transducer array is situated on the distal end of a slender probe.

6. The ultrasonic diagnostic apparatus according to claim 1, wherein each ultrasonic transducer comprising said ultrasonic transducer array is disposed along at least one of the following surfaces: an arc-shaped surface, a flat surface, or a convex surface.

7. The ultrasonic diagnostic apparatus according to claim 1, wherein said ultrasonic transducer array is situated on a probe for external application.

8. The ultrasonic diagnostic apparatus according to claim 1, wherein said synthesis processing circuit has an amplitude weighting processing unit for weighting the amplitude of said complex data.

9. The ultrasonic diagnostic apparatus according to claim 8, wherein said amplitude weighting processing unit performs weighting so that the amplitude of the complex data of the ultrasonic transducer serving as a standard is great, and so that the amplitude of the complex data of the ultrasonic transducers apart from said ultrasonic transducer serving as a standard is small.

10. The ultrasonic diagnostic apparatus according to claim 2, wherein said quadrature detection circuit further comprises first and second multipliers which respectively take as a first reference signal said standard signal and take as a second reference signal said standard signal with shifted by 90 degrees in phase and respectively multiply said echo signal, and first and second low-pass filters which obtain a pair of real component and imaginary component by means of passing signals from the respectively multiplied first and second multiplied signals each to the lower band side of said standard signal.

11. The ultrasonic diagnostic apparatus according to claim 1, wherein said memory comprises two two-dimensional memories for storing in time-sequence each of the real component and imaginary component of said complex data corresponding to the scanning area scanned with said ultrasonic transducer array.

12. The ultrasonic diagnostic apparatus according to claim 1, further comprising and address information storage unit for storing address information for reading complex data following a wave-front locus, regarding complex data stored in time-sequence in said memory, in accordance with ultrasonic wave-front locus distribution determined by the acoustic distance between an arbitrary position in the scanning area scanned with said ultrasonic transducer array and said ultrasonic transducers.

13. The ultrasonic diagnostic apparatus according to claim 12, wherein said phase correction circuit further comprises a storage unit for phase correction data which corrects phase offset of standard complex data obtained from the ultrasonic transducer serving as the standard from the standard phase, regarding complex data read from said memory following said wave-front locus according to said address information.

14. An ultrasonic diagnostic apparatus according to claim 13, wherein said storage unit for phase correction data stores real component phase correction data and imaginary component phase correction data, respectively corresponding with the pair of real component and imaginary component of each complex data.

15. The ultrasonic diagnostic apparatus according to claim 14, wherein said phase correction circuit multiplies and adds the real component phase correction data and imaginary component phase correction data regarding the real component and imaginary component forming a pair comprising the complex data read from said memory following the wave-front locus, and matches the phase of each complex data to the standard phase in a complex vector manner.

16. The ultrasonic diagnostic apparatus according to claim 15, wherein following said synthesis processing circuit squaring the real component and imaginary component of each complex data matched to the standard phase in a complex vector manner, adding is performed and reflection intensity calculation processing for calculating the ultrasonic wave reflection intensity at an arbitrary position in said scanning area is performed.

17. The ultrasonic diagnostic apparatus according to claim 13, wherein said ultrasonic transducer serving as a standard is situated in the center position of said ultrasonic transducer array.

18. The ultrasonic diagnostic apparatus according to claim 17, wherein said synthesis processing circuit performs weighting processing so that the amplitude of the complex data of the ultrasonic transducer serving as a standard is great, and so that the amplitude of the complex data of the ultrasonic transducer apart from said ultrasonic transducer serving as a standard is small, the degree of decrease being such that corresponds to the distance from the standard transducer.

19. The ultrasonic diagnostic apparatus according to claim 12, wherein said phase correction circuit matches the complex data In, Qn (In: real component, Qn: imaginary component) for the n-th ultrasonic transducer read from said memory following said wave-front locus according to said address information with the standard phase by means of phase correction calculation expressed by the following expression:

$$(In+jQn) \times An \times exp(j\phi n)$$

wherein $\phi n$ represents phase offset of In, Qn from the standard phase of standard complex data obtained by the ultrasonic transducer serving as the standard, an represents the amplitude of said complex data In, Qn, and j represents imaginary number unit.

20. The ultrasonic diagnostic apparatus according to claim 1, wherein the data synthesized by said synthesis processing circuit is subjected to brightness modulation and is displayed upon a monitor as a B-mode ultrasonic wave image.

21. An echo signal processing circuit, comprising:

memory for storing real and imaginary components of complex data obtained by quadrature detection of echo signals received by each of a plurality of ultrasonic transducers;

an address storage unit for storing address data read following a wave-front locus distribution of an ultrasonic wave determined by the ultrasonic wave propagation distance between an arbitrary position to be imaged and each ultrasonic transducer, within the scanning range scanned with each of said plurality of ultrasonic transducers, regarding the complex data stored in said memory;

a phase correction data storage unit for storing phase correction data for matching the phase of complex data read from said memory following a wave-front locus with a standard phase calculated from the time of complex data obtained from one of said plurality of ultrasonic transducers serving as the standard;

a phase correction circuit for matching the complex data read from said memory following a wave-front locus to said standard phase, by performing complex vector phase correction thereto with said phase correction data; and a reflection intensity calculation unit for calculating reflection intensity of the ultrasonic wave regarding said arbitrary position from said complex data of which the phase has been matched by means of said phase correction circuit.

22. An ultrasonic diagnostic apparatus, comprising:

an ultrasonic scanner which performs transmitting and receiving of ultrasonic waves while changing position;

a complex data generation circuit for generating digital complex data from echo signals obtained from said ultrasonic scanner in each position;

memory for storing said complex data;

a phase correction circuit for reading the complex data stored in said memory, and performing complex vector phase correction so as to match each phase of each complex data to a single standard phase, according to the delay time determined by the ultrasonic scanner in each position; and a synthesis processing circuit for performing synthesis processing in order to calculate reflection intensity from the each of the complex data subjected to matching by said phase correction circuit.

23. The ultrasonic diagnostic apparatus according to claim 22, wherein said ultrasonic scanner comprises an ultrasonic transducer group having a plurality of ultrasonic transducers situated each in different positions.

24. The ultrasonic diagnostic apparatus according to claim 22, wherein said ultrasonic scanner comprises an ultrasonic transducer that emits and receives at least a single ultrasonic beam and a movement member which moves the position of said ultrasonic transducer.

25. The ultrasonic diagnostic apparatus according to claim 24, wherein said movement member scans said ultrasonic transducer along said each position along at least one of the following: an arc, or a straight line.

26. An echo signal processing circuit, comprising:

memory for storing complex data obtained by quadrature detection of echo signals received by an ultrasonic transducer at the same position that ultrasonic waves were transmitted from said ultrasonic transducer at different positions within a certain range;

a complex data reading unit for reading complex data from said memory following a wave-front locus distribution of an ultrasonic wave determined by the propagation distance between a position to be imaged and the position of the ultrasonic transducer at which transmitting and receiving was performed, within the scanning range scanned by ultrasonic wave from each position within said certain range;

a phase correction data storage unit for storing phase correction data for matching the phase of complex data read from said memory following a wave-front locus with a standard phase calculated from the time of generation of standard complex data obtained from an ultrasonic transducer at a position serving as the standard;

a phase correction circuit for correcting real component and imaginary component forming a pair comprising the complex data read from said memory following a wave-front locus using said phase correction data, and matching to said standard phase by means of performing complex vector phase correction thereto; and a power calculating unit which calculates the power component of echo signals by squaring the real component and imaginary component of the complex data subjected to phase correction by said phase correction circuit, and adding each.

27. The ultrasonic diagnostic apparatus according to claim 3, wherein said quadrature detection circuit further comprises first and second multipliers which respectively take as a first reference signal said standard signal and take as a second reference signal said standard signal with shifted by 90 degrees in phase and respectively multiply said echo signal, and first and second low-pass filters which obtain a pair of real component and imaginary component by means of passing signals from the respectively multiplied first and second multiplied signals each to the lower band side of said standard signal.

28. The ultrasonic diagnostic apparatus according to claim 1, wherein said complex data generation circuit operates only one of said plurality of ultrasonic transducers at a time such that said operated ultrasonic transducer only receives echo signals from acoustics generated by the same operated ultrasonic transducer.

29. The ultrasonic diagnostic apparatus according to claim 22, wherein ultrasonic scanner includes a plurality of ultrasonic transducers, wherein only one of the plurality of ultrasonic transducers is operated at a time such that said operated ultrasonic transducer only receives echo signals from acoustic signals generated by the same operated ultrasonic transducer.

* * * * *